Figure 1:
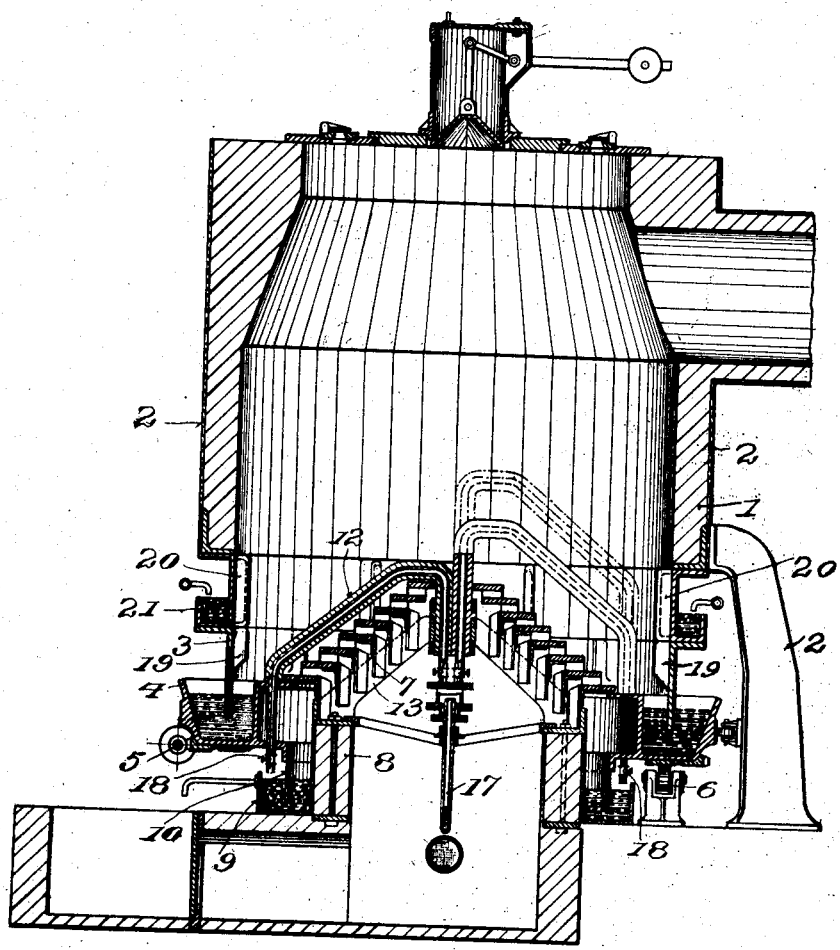

J. REULEAUX.
GAS PRODUCER.
APPLICATION FILED FEB. 16, 1909.

948,249.

Patented Feb. 1, 1910.
2 SHEETS—SHEET 1.

WITNESSES:

INVENTOR,

Att'y.

J. REULEAUX.
GAS PRODUCER.
APPLICATION FILED FEB. 16, 1909.
948,249.
Patented Feb. 1, 1910.
2 SHEETS—SHEET 2.
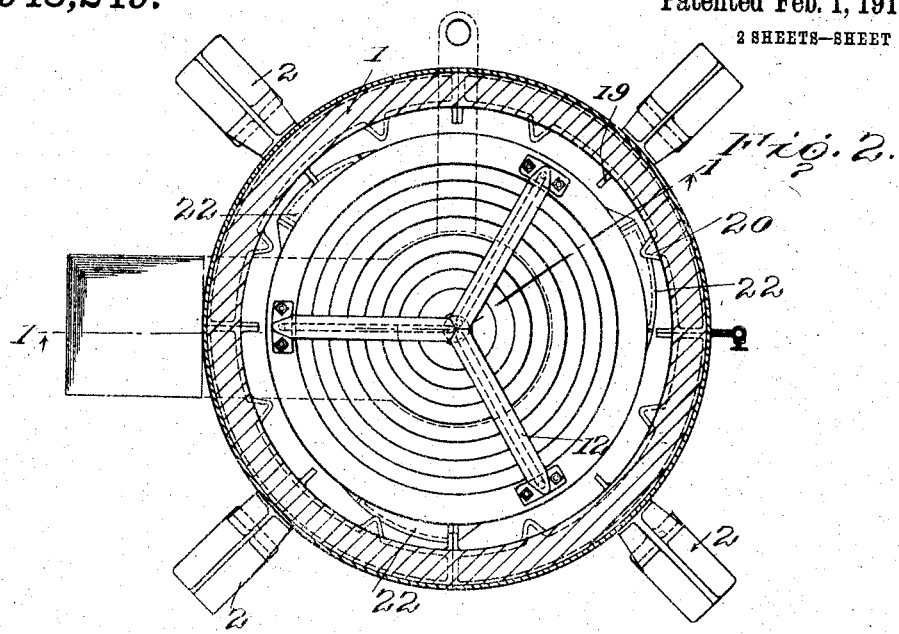
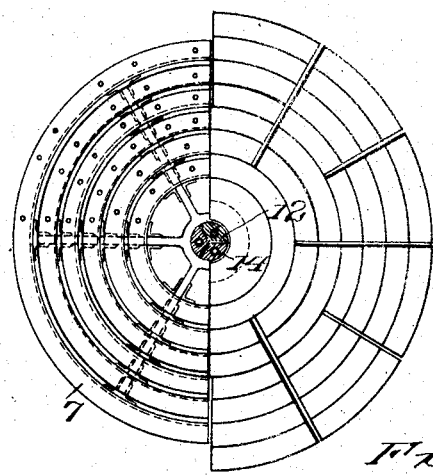
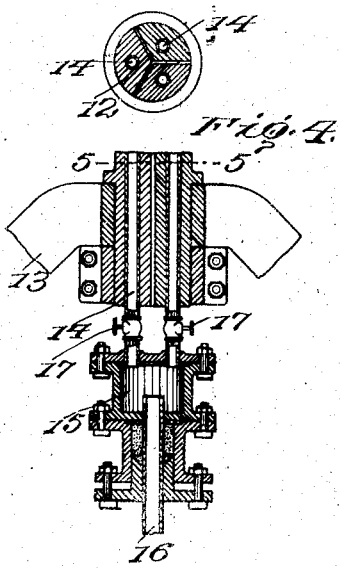
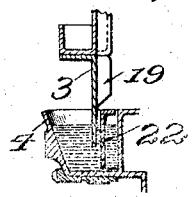
WITNESSES
INVENTOR

UNITED STATES PATENT OFFICE.

JOSEF REULEAUX, OF WILKINSBURG, PENNSYLVANIA, ASSIGNOR TO ALEXANDER LAUGHLIN, OF SEWICKLEY, PENNSYLVANIA.

GAS-PRODUCER.

948,249.    Specification of Letters Patent.    Patented Feb. 1, 1910.

Application filed February 16, 1909. Serial No. 478,258.

*To all whom it may concern:*

Be it known that I, JOSEF REULEAUX, of Wilkinsburg, in the county of Allegheny and State of Pennsylvania, have invented certain new and useful Improvements in Gas-Producers; and I do hereby declare the following to be a full, clear, and exact description of the invention, such as will enable others skilled in the art to which it appertains to make and use the same.

The primary object of this invention is to provide in a gas producer simple and highly efficient means for effectively stirring or agitating the fuel bed and breaking the clinkers.

The invention will be hereinafter fully set forth and particularly pointed out in the claims.

In the accompanying drawings, Figure 1 is a vertical sectional view on line 1—1, Fig. 2. Fig. 2 is a horizontal sectional view on line 2—2, Fig. 1, with parts omitted. Fig. 3 is a plan view, with parts omitted, of the grate. Fig. 4 is an enlarged vertical sectional view of the inner ends of the agitators and the water supply box. Fig. 5 is a horizontal section on line 5—5, Fig. 4. Fig. 6 is a fragmentary sectional view through one of the clinker crushing plates.

Referring to the drawings, 1 designates the producer body which is supported wholly by brackets 2. From this body depends an ash-hopper 3 the lower end of which is sealed by the water in trough 4, which latter may be rotated by gearing 5. The trough is supported by rollers, one of which is shown at 6, in Fig. 1.

7 designates the conical like stationary grate, which is shown as composed of a series of spaced-apart members fixedly mounted on a central support 8. This support is surrounded by a second water trough 9 into which projects a plate 10 depending from water trough 4.

12 designates a series of agitators which are caused to revolve with the water trough and over the grate. They are shown as consisting each of a hollow bar extending from the axial center of the grate down and over the latter, their lower ends being connected to trough 4. One agitator may, in some instances, suffice, but I prefer to use three, as shown in the drawings, so that each may travel on a different plane, and thus increase the extent of agitation of the fuel-bed. The highest of these is indicated in Fig. 1 by dot and dash. These agitators I have shown as supported at the center of the grate by braces 13, and through each agitator extends a pipe 14, which pipe at its inner end opens into a water box 15. Water is supplied to this box by pipe 16 around which the box rotates as the agitators and trough 4 are actuated. Pipes 14 are provided with valves 17 and 18, and the water from these pipes is discharged into trough 9.

To further aid in breaking the clinkers the ash-hopper 3 may be provided with a series of solid ribs 19, and an upper series of hollow ribs 20 both extending inwardly, the ribs 20 being cooled by water from a trough 21 surrounding the ash-hopper. For the purpose of crushing such clinkers as may pass between the ribs and the agitators, I provide the inner wall of trough 4 with plates 22 which are gradually curved outwardly toward the ash-hopper to lessen the distance between themselves and the hopper so that as the trough is rotated clinkers will be crushed before they pass beneath the sealed end of the hopper.

I claim as my invention:—

1. In a gas producer, the combination with a stationary producer-body, and a stationary ash-hopper, of a stationary grate, a rotary water trough forming a seal for said hopper, and means for agitating the fuel bed revoluble over said grate concurrently with the rotation of said water trough.

2. In a gas producer, the combination with a stationary producer-body, and an ash-hopper depending from the latter, of a stationary grate, a rotary water trough forming a seal for said ash-hopper, and means for agitating the fuel bed carried by said trough.

3. In a gas producer, the combination with a stationary producer-body, and an ash-hopper depending from the latter, of a stationary grate, a rotary water trough forming a seal for said ash-hopper, an agitator arm extending from the center of said grate and carried by said water trough, and means for cooling said arm.

4. In a gas producer, the combination with a stationary producer-body, and an ash-hopper depending from the latter, of a stationary grate, a rotary water trough forming a seal for said ash-hopper, and a series of water cooled agitator arms arranged on different planes and extending over said grate and carried by said trough.

5. In a gas producer, the combination with a stationary producer-body, and an ash-hopper depending from the latter, of a stationary grate, a rotary water trough forming a seal for said ash-hopper, a series of agitator arms having their inner ends mounted at the axial center of said grate and connected at their outer ends to said water trough, and means for supplying a cooling medium to said arms at the inner ends thereof.

6. In a gas producer, the combination with a stationary producer-body, and an ash-hopper depending from the latter, of a stationary grate, a rotary water trough forming a seal for said ash-hopper, a second water trough, a plate depending from the first mentioned water trough into the second water trough, a series of agitator arms designed to revolve with the first mentioned water trough and extended over said grate from the axial center thereof, a water box, and a series of pipes leading from said box through said arms and opening at their outer ends into said second water trough.

7. In a gas producer, the combination with a stationary producer-body, and an ash-hopper depending therefrom, of a stationary grate, a rotary water trough forming a seal for said hopper, and crusher plates secured to the inner wall of said hopper and curved outwardly toward the ash-hopper.

8. In a gas producer, the combination with a stationary producer-body, and an ash-hopper depending therefrom and having a series of water-cooled hollow ribs projecting inwardly therefrom, of a grate, a rotary water trough forming a seal for said hopper, and means for agitating the fuel and crushing clinkers, such means extending over said grate and revoluble with said water trough.

In testimony whereof, I have signed this specification in the presence of two subscribing witnesses.

JOSEF REULEAUX.

Witnesses:
FRANCIS S. MAGUIRE,
JOHN A. MURPHY.